Patented July 16, 1940

2,208,485

UNITED STATES PATENT OFFICE 2,208,485

PROCESS FOR THE MANUFACTURE OF DISUBSTITUTED CARBAMIC ACID ESTERS OF PHENOLS CONTAINING A BASIC SUBSTITUENT

John A. Aeschlimann, Riehen, near Basel, Switzerland, assignor to Hoffmann-La Roche, Inc., Nutley, N. J., a corporation of New Jersey No Drawing. Application March 11, 1938, Serial No. 195,412. In Germany April 24, 1937

5 Claims. (Cl. 260—479)

In accordance with the process described in U. S. Patent No. 1,905,990 disubstituted carbamic acid esters of phenols containing a basic substituent are obtained by allowing dialkyl-, aryl-alkyl- or diaryl-carbamyl halogenides to react with alkali salts of phenols having a basic substituent.

It has now been found that instead of the alkali salts of phenols having a basic substituent, the free phenols can advantageously be used.

The preparation of alkali salts of phenols having a basic substituent, which are in most cases readily oxidised by atmospheric oxygen and are frequently hygroscopic, is often difficult on account of these unpleasant properties. By using the free phenols these difficulties can be avoided. The action of disubstituted carbamyl chlorides on phenols having a basic substituent can take place in the presence or absence of a solvent. It is usually advisable to use one molecule of carbamyl chloride to 2 molecules of the basically substituted phenol. The reaction proceeds according to the following equation:

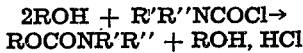

In this equation R represents a phenol residue having a basic substituent, R' and R'' alkyl, aryl or aralkyl or, both taken together, the carbon chain of a piperidine ring. It is not, however, necessary to adhere to these proportions. Other amounts of the starting materials can also be used, for instance equimolecular quantities, which is particularly advantageous if an arylalkylcarbamyl chloride is caused to act on a phenol containing a quaternary basic group. In this case the hydrogen halide set free serves to neutralise the quaternary ammonium hydroxide; the disubstituted carbamic ester of the phenol quaternary halide is directly formed. The conditions for the reaction, for instance the temperature, can be varied within a wide range.

Example 1

A solution of 42 parts by weight of m-dimethylaminophenol and 25 parts by weight of α-methyl-piperidine-N-carbonyl chloride (an oil boiling at 120° C. at a pressure of 15 mm., obtained by the addition of α-pipecoline to a benzene solution of phosgene, separating the pipecoline hydrochloride and subsequent distillation) in 60 parts by weight of benzene, is heated for 6 hours on the steam bath. The mixture is colled, washed with 30 parts by weight of water to dissolve the dimethylaminophenol hydrochloride formed, the benzene layer agitated with 10 parts by weight of a cold 10% solution of caustic soda, separated and, after washing again with water, dried with potash. From the combined aqueous layers about half of the dimethylaminophenol used can be recovered. The benzene is distilled off and the residual m-dimethylaminophenyl ester of pipecolyl N-carboxylic acid distilled at 230° C. at a pressure of 12 mm. By the action of methyl bromide in acetone solution, the quaternary bromide is formed; it melts at 186° C. The quaternary salt is easily soluble in water.

Example 2

A mixture of 165 parts by weight of m-diethylaminophenol and 110 parts by weight of dimethyl carbamyl chloride is slowly heated in a graphite bath. At about 110° C. the reaction becomes vigorous and the mixture soon starts to boil. After heating for 2 hours at 100–150° C. the product is cooled, shaken with 300 parts by weight of ether and 200 parts by weight of water, the ether layer removed and washed with 50 parts by weight of a 10% solution of caustic soda and then again with water, dried with potash and distilled in vacuo. The dimethyl carbamic ester of m-diethylaminophenol boils at 210° C. at a pressure of 15 mm. forming a water-soluble methiodide melting at 139° C., which has a stronger physiological action than physostigmine.

Example 3

17 parts by weight of methylphenyl carbamyl chloride are added to an alcoholic solution of m-hydroxy-phenyl-trimethylammonium hydroxide obtained by causing 12.5 parts by weight of silver-oxide or 5.6 parts by weight of potassium hydroxide to act on 28 parts by weight of m-hydroxy-phenyl-trimethylammonium bromide in 150 parts by weight of alcohol and removing the inorganic iodide by filtration. The reaction is exothermic and is completed by boiling on the steam bath for 2 hours, whereby the initially alkaline reaction mixture becomes neutral. The quaternary chloride formed is very easily soluble in alcohol and is best converted into the bromide for which purpose the alcohol is distilled off in vacuo and the residue treated with a solution of 11 parts by weight of sodium bromide in 100 parts by weight of methyl alcohol. The sodium chloride which separates is removed, the solution evaporated to dryness, the residue taken up in 50 parts by weight of hot absolute alcohol, freed from small quantities of sodium-chloride and -bromide by filtration, and cooled. The methyl phenyl carbamic ester of m-hydroxy-phenyl-trimethylammonium bromide is separated.

Example 4

A mixture of 28 parts by weight of m-dimethylamino phenol and 18.5 parts by weight of methyl benzyl carbamyl chloride obtained in an analogous manner to the chloride in Example 1 is heated for 6 hours on the steam bath and, after addition of benzene, worked up as in Example 1. The methyl benzyl carbamic ester of m-dimethyl amino phenol boils at 270° C., at a pressure of 14 mm. The quaternary bromide melting at 154° C. is formed after standing with methyl bromide for 2 days.

I claim:

1. A process for the preparation of disubstituted carbamic esters of the formula ROCO—Y wherein R represents a phenyl radical containing a basic substituent selected from the group consisting of dialkylamino radicals, dialkylaminoalkyl radicals and trialkylammonium halide radicals, and wherein —Y is selected from the group consisting of

wherein R' and R" are selected from the group consisting of alkyl radicals, aralkyl and aryl radicals of the benzene series, and —N=R''' wherein R''' is an alkylene radical forming a piperidine nucleus with the nitrogen atom, which comprises reacting disubstituted carbamyl halides of the formula Hal—CO—Y with phenols containing a basic substituent selected from the group consisting of dialkylamino radicals, dialkylaminoalkyl radicals and trialkyl-ammonium-hydroxide radicals.

2. A process for the preparation of diamethylcarbamic ester of m-diethylaminophenol which comprises reacting dimethylcarbamyl chloride with m-diethylaminophenol.

3. A process for the manufacture of the methyl phenyl carbamic ester of m-hydroxyphenyl trimethylammonium halide which comprises reacting a methyl-phenyl-carbamyl halide with m-hydroxyphenyl trimethylammonium hydroxide.

4. A process for the preparation of disubstituted carbamic esters of the formula ROCO—Y wherein R represents a phenyl radical containing a trialkyl ammonium halide substituent and wherein Y is selected from the group consisting of

wherein R' and R" are selected from the group consisting of alkyl radicals, and aralkyl and aryl radicals of the benzene series, and —N=R''' wherein R''' is an alkylene radical forming a piperidine nucleus with the nitrogen atom, which comprises reacting disubstituted carbamyl halides of the formula Hal—CO—Y with a hydroxy phenyl trialkyl ammonium hydroxide.

5. A process for the preparation of disubstituted carbamic esters of the formula ROCO—Y wherein R represents a phenyl radical containing a trialkyl ammonium halide substituent and wherein Y is selected from the group consisting of

wherein R' and R" are selected from the group consisting of alkyl radicals, aralkyl and aryl radicals of the benzene series, and —N=R''' wherein R''' is an alkylene radical forming a piperidine nucleus with the nitrogen atom, which comprises reacting disubstituted carbamyl halides of the formula Hal—CO—Y with a dialkylamino phenol, separating the resulting disubstituted carbamic ester of the dialkylamino phenol and reacting such product with an alkyl halide.

JOHN A. AESCHLIMANN.